(12) United States Patent
Valentine et al.

(10) Patent No.: US 6,477,366 B1
(45) Date of Patent: Nov. 5, 2002

(54) SYSTEM AND METHOD FOR VIRTUAL CITIZEN'S BAND RADIO IN A CELLULAR NETWORK

(75) Inventors: Eric Valentine, Plano; Vladimir Alperovich, Dallas; Walt Evanyk, Plano, all of TX (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/401,562

(22) Filed: Sep. 22, 1999

(51) Int. Cl.[7] .................................................. H04M 3/42
(52) U.S. Cl. ........................ 455/416; 455/517; 455/518; 455/519
(58) Field of Search ................................. 455/416, 422, 455/432, 433, 517, 518, 519, 428, 560

(56) References Cited

U.S. PATENT DOCUMENTS

| | | | | | |
|---|---|---|---|---|---|
| 5,970,417 | A | * | 10/1999 | Toyryla et al. | 455/519 |
| 6,081,711 | A | * | 6/2000 | Geulen | 455/432 |
| 6,138,002 | A | * | 10/2000 | Alperovich et al. | 455/407 |
| 6,163,692 | A | * | 12/2000 | Chakrabarti et al. | 455/416 |
| 6,185,421 | B1 | * | 2/2001 | Alperovich et al. | 455/433 |
| 6,185,430 | B1 | * | 2/2001 | Yee et al. | 455/519 |
| 6,233,461 | B1 | * | 5/2001 | Chinitz et al. | 455/522 |
| 6,292,670 | B1 | * | 9/2001 | Kaura et al. | 455/518 |

* cited by examiner

*Primary Examiner*—Edward F. Urban
*Assistant Examiner*—Marceau Milord
(74) *Attorney, Agent, or Firm*—Jenkens & Gilchrist, P.C.

(57) ABSTRACT

A telecommunications system and method is disclosed for creating "virtual Citizen's Band (CB) radio channel groups" within a cellular network. In a first embodiment, the virtual channel groups are built within the Mobile Switching Center (MSC). Each mobile subscriber participant is associated with the other mobile subscriber participants in the MSC, using a transaction identifier and conference bridges. Each group can be monitored, and each individual participants communication link can be controlled independently to facilitate individual disconnection. In a second embodiment, the virtual channel groups are built directly over the air. Participating mobile subscribers within range of each other can communicate directly with one another, using the same forward and reverse traffic channels.

33 Claims, 5 Drawing Sheets

SYSTEM AND METHOD FOR VIRTUAL CITIZEN'S BAND RADIO IN A CELLULAR NETWORK

BACKGROUND OF THE PRESENT INVENTION

Field of the Invention

The present invention relates generally to telecommunications systems and methods for conference calling in a cellular network, and specifically to defining network-based conference call groups accessible to mobile subscribers.

BACKGROUND OF THE PRESENT INVENTION

The use of Citizen's Band (CB) radio has become ubiquitous since it became popularized in the 1970s. While it is most commonly associated with truckers, its attraction is more widespread because it has become known as a medium for "communities of interest." Many people have compared CB to a party line on the air.

The radio technology for CB radio is basically push-to-talk," with Federal Communications Commission (FCC) regulations on power output. However, these FCC power-regulations are often ignored by CB aficionados. It is a trivial matter to connect power amplifiers to a CB radio and effectively "jam" others from the channel, although this practice violates FCC regulations.

In addition, since there are only a limited number of frequencies reserved for CB radio, the "communities of interest" may outnumber the number of available frequencies. Thus, different topics of discussion may be present on each CB radio frequency, with only part of the listening group interested in each topic. This may produce competition for air time, and discord among CB users.

Yet another problem with CB radio is that while some content may be illegal or objectionable, it is not practical to police the conversations or individuals making the objectionable comments. Therefore, some of the CB frequencies have become unusable for certain individuals, such as traveling families. The result is akin to an unmoderated news group on the Internet, full of profanity and "spam."

Finally, with the advent of cellular telecommunications, which is one of the fastest growing and most demanding telecommunications applications in the world today, many normal CB users have begun to subscribe to cellular service. However, those mobile subscribers that participate in CB-radio must carry a CB radio, in addition to their mobile telephone. In addition, the cellular network operators cannot capitalize on the CB market. Furthermore, there is no real alternative to CB radio today in the cellular world.

SUMMARY OF THE INVENTION

The present invention is directed to telecommunications systems and methods for creating "virtual CB radio channel groups" within a cellular network. In a first embodiment, the virtual channel groups are built within the Mobile Switching Center (MSC). Each mobile subscriber participant is associated with the other mobile subscriber participants in the MSC, using a transaction identifier and conference bridges. A group is established based on individual preferences stored in the cellular network or provided to the cellular network by the individual mobile subscribers. Each group can be monitored, and each individual participants communication link can be controlled independently to facilitate individual disconnection. In a second embodiment, the virtual channel groups are built directly over the air. In this embodiment, participating mobile subscribers within range of each other can communicate directly with one another, using the same forward and reverse traffic channels. Although these traffic channels are allocated and controlled by the base station, they are not actually received or transmitted by the base station. Thus, with this embodiment, monitoring of communications would not be feasible.

BRIEF DESCRIPTION OF THE DRAWINGS

The disclosed invention will be described with reference to the accompanying drawings, which show important sample embodiments of the invention and which are incorporated in the specification hereof by reference, wherein.

DETAILED DESCRIPTION OF THE PRESENTLY PREFERRED EXEMPLARY EMBODIMENTS

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

Figure 1:
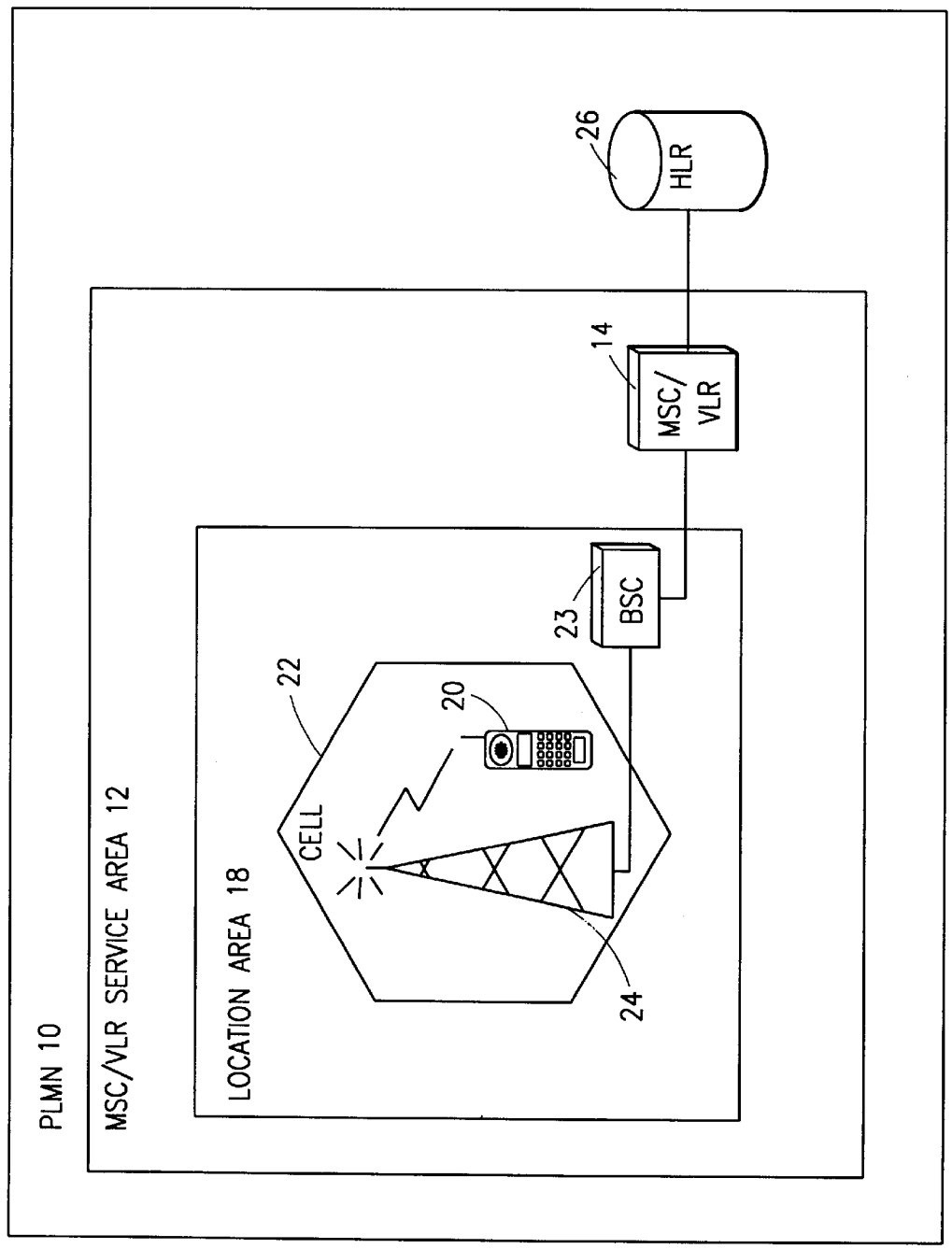
FIG. 1 is a block diagram of a conventional cellular network.

With reference now to FIG. 1 of the drawings, there is illustrated a sample cellular network 10, such as a Global System for Mobile Communications (GSM) Public Land Mobile Network (PLMN), which in turn is composed of a plurality of areas 12, each with a Mobile Switching Center (MSC) and an integrated Visitor Location Register (VLR) (MSC/VLR) 14 therein. The MSC/VLR 14 provides a circuit switched connection of speech and signaling information between a Mobile Station (MS) 20 and the PLMN 10. The MSC/VLR areas 12, in turn, include a plurality of Location Areas (LA) 18, which are defined as that part of a given MSC/VLR area 12 in which the MS 20 may move freely without having to send update location information to the MSC/VLR 14 that controls the LA 18. Each LA 18 is further divided into a number of cells 22.

The MS 20 is the physical equipment, e.g., a car phone or other portable phone, used by mobile subscribers to communicate with the cellular network 10, each other, and users outside the subscribed network, both wireline and wireless.

The MS 20 may have a memory, such as a Subscriber Identity Module (SIM) card, therein for storing subscriber related information, such as the International Mobile Subscriber Identity (IMSI) number, subscriber authentication keys, temporary network data and service related data, e.g., language preference.

The MSC/VLR 14 is in communication with at least one Base Station Controller (BSC) 23, which, in turn, is in contact with at least one Base Transceiver Station (BTS) 24. The BTS 24 is the physical equipment, illustrated for simplicity as a radio tower, that provides radio coverage to the cell 22 for which it is responsible. It should be understood that the BSC 23 may be connected to several BTS's 24, and may be implemented as a stand-alone node or integrated with the MSC/VLR 14.

With further reference to FIG. 1, the PLMN Service Area or cellular network 10 also includes a Home Location Register (HLR) 26, which is a database maintaining all subscriber information, e.g., user profiles, current location information, IMSI numbers, and other administrative information, for subscribers registered within that PLMN 10. The HLR 26 may be co-located with a given MSC/VLR 14, integrated with the MSC/VLR 14, or alternatively can service multiple MSC/VLRs 14.

Figure 2:
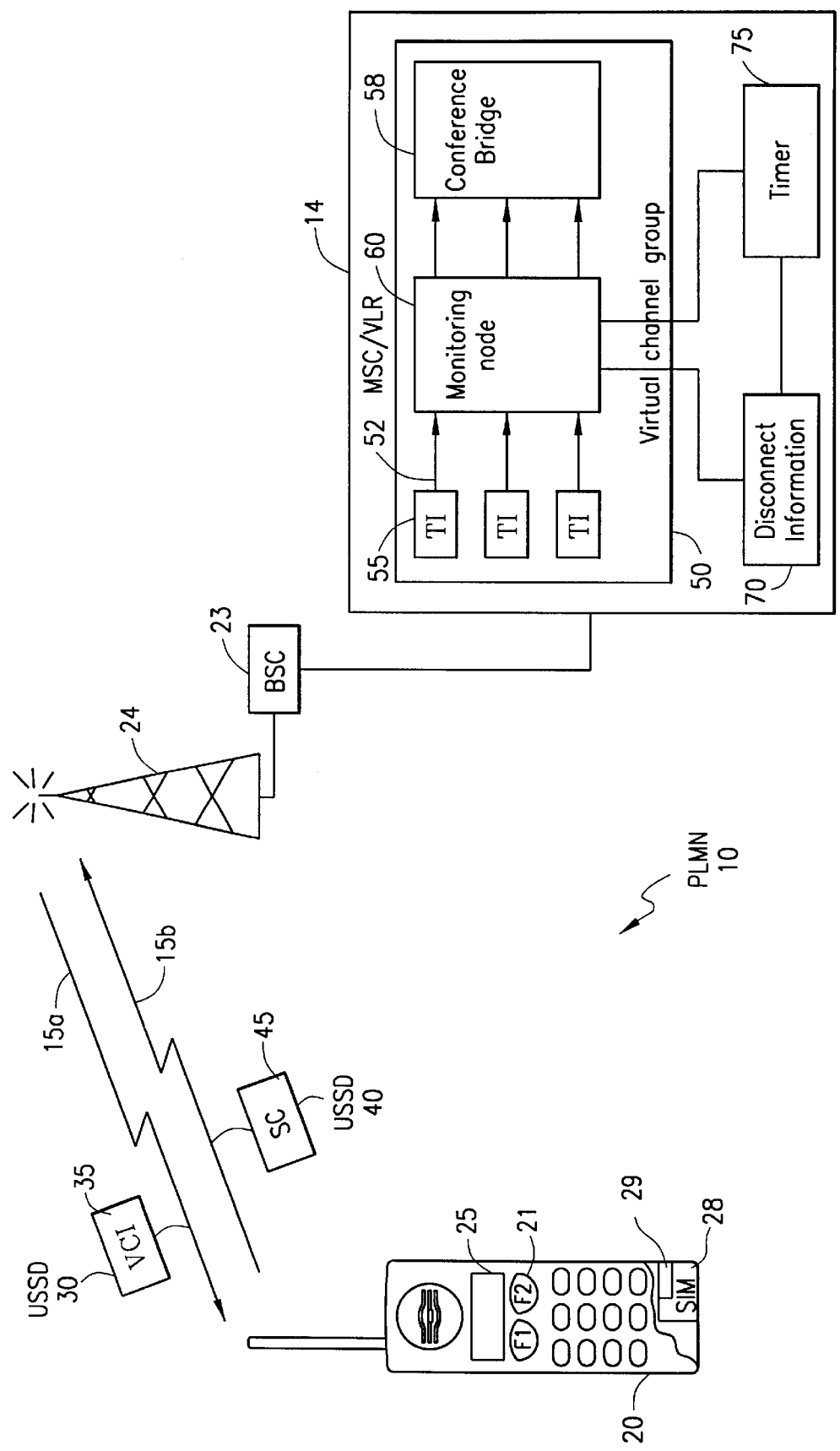
FIG. 2 is a block diagram illustrating the formation of a virtual CB channel group of mobile subscribers built in the network, in accordance with embodiments of the present invention.

To provide Citizen's Band (CB) radio "community of interest" features to mobile subscribers, the cellular network operator can create "virtual CB radio channel groups." As shown in FIG. 2 of the drawings, in one embodiment, these virtual channel groups 50 are created using a network-based technique, so that the virtual channel groups 50 are handled using normal GSM radio procedures.

Each virtual channel group 50 comprises a different group of mobile subscribers communicating over separate forward and reverse traffic channels 15a and 15b. All of the forward and reverse traffic channels 15a and 15b, respectively, within a virtual channel group 50 are associated together in the MSC/VLR 14 using a transaction identifier 55 assigned by the MSC/VLR 14. The groups 50 are built-up in the MSC/VLR 14 using conference bridges 58 to create a conference call between all of the participating mobile subscribers. Thus, each mobile subscriber that is associated with the transaction identifier 55 for a particular group 50 is connected to the other participating mobile subscribers associated with the transaction identifier 55 over conference bridges 58.

Participation in a virtual channel group 50 by a mobile subscriber depends on information stored in the HLR 26 (shown in FIG. 1) or SIM card 28, or information provided to the MSC/VLR 14 by the mobile subscriber. For example, the PLMN 10 serving the MS 20 may offer several virtual channel groups 50, which can be subscribed to by the mobile subscriber in advance. Thus, whenever the MS 20 performs a location update to the MSC/VLR 14 serving the MS 20, information concerning the virtual channel group 50 subscribed to can be provided to the MSC/VLR 14 by the MS 20 or by the HLR 26. Thereafter, upon reception of a service code 45, e.g., *xx, from the MS 20 in an Unstructured Supplementary Service Data (USSD) message 40, the MSC/VLR 14 can assign the transaction identifier 55 for the designated virtual channel group 50 and connect the MS 20 to the designated virtual channel group 50, using a conference bridge 58. The service code 45 includes a request to join the designated virtual channel group 50. This service code 45 can be dialed by the mobile subscriber on the MS 20.

Alternatively, if the designated virtual channel group(s) 50 are stored in the SIM card 28, a virtual channel group feature 29 can also be included in the SIM card 28 to allow the mobile subscriber to select a particular designated virtual channel group 50. For example, a menu of features can be displayed on a display 25 of the MS 20, and the mobile subscriber can select the virtual channel group feature 29 from this menu using one or more function keys 21 on the MS 20. Once selected, the virtual channel group feature 29 can display a list of subscribed-to virtual channel groups for the mobile subscriber to select from, using the function keys 21. After selection of the designated virtual channel group 50, the MS 20 can send this designated virtual channel group 50 to the MSC/VLR 14 in a USSD message 40. Thereafter, the MSC/VLR 14 can assign the transaction identifier 55 associated with the designated virtual channel group 50 to the MS 20, allocate a traffic channel (forward 15a and reverse 15b) to the MS 20 and bridge the MS 20 connection with the virtual channel group 50 over the conference bridge 58.

Figure 3:
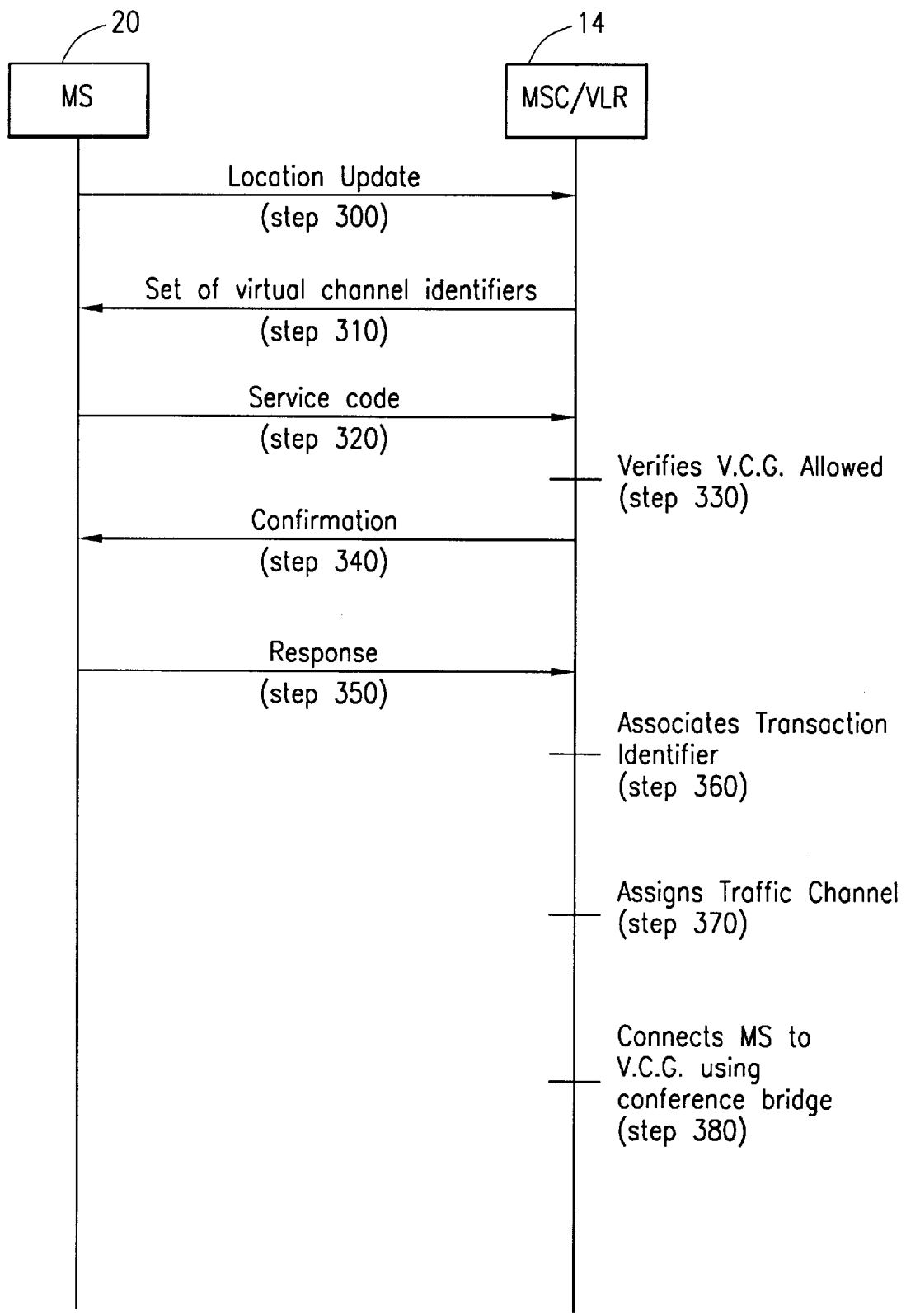
FIG. 3 is a signaling diagram illustrating sample signaling for participating in a group of the type shown in FIG. 2 of the drawings.

Alternatively, with reference now to FIG. 3 of the drawings, which will be described in connection with FIG. 2 of the drawings, the MS 20 can be connected to the designated virtual channel group 50 based upon a dialog initiated by the MSC/VLR 14. For example, upon entering an MSC/VLR 14 service area 12 (shown in FIG. 1), and performing a location update (not shown) to the MSC/VLR 14 (step 300), the MSC/VLR 14 can send a set of virtual channel identifiers 35 to the MS 20 in a USSD message 30 (step 310). For instance, the USSD message 30 could read: "Channel 1: Road Chat, Channel 2: Local Entertainment, Channel 3: Kid Stuff, Channel 4: Not Kid Stuff." In response to the USSD message 30, the mobile subscriber can enter a designated virtual channel group 50 by, for example, pressing "1" on the MS 20. When the mobile subscriber presses "1" on the MS 20, the MS 20 interprets this as an instruction to initiate a response USSD message 40 to the originator of the USSD message 30 (the MSC/VLR 14), including the designated virtual channel group 50 (step 320). For example, within the response USSD message 40, the MS 20 can include a service code 45, e.g., *xx, which requests the MSC/VLR 14 to connect the MS 20 to the designated virtual channel group 50. It should be understood that the appropriate service code 45 would be included in the original USSD message 30 sent to the MS 20.

When the MSC/VLR 14 receives the USSD message 40, including the request to join the designated virtual channel group 50, the MSC/VLR 14 verifies that the MS 20 is allowed to join the designated virtual channel group 50 (step 330), e.g., by checking the subscriber record (not shown) associated with the MS 20. If so, the MSC/VLR 14 establishes the conference call connection to the designated virtual channel group 50 by, for example, sending another confirmation USSD message (not shown) to the MS 20 (step 340), such as "This is the Road Chat channel, brought to you by Powertel. Please mind your manners and press 1 to continue." When the subscriber presses "1," the MS 20 sends another response USSD message (not shown) to the MSC/VLR 14 (step 350). Thereafter, the MSC/VLR 14 associates the transaction identifier 55 with the MS 20 (step 360), assigns a traffic channel 15a and 15b to the MS 20 (step 370) and establishes a call connection between the MS 20 and the other participants in the designated virtual channel group 50 using at least one conference bridge 58 within the MSC/VLR 14 (step 380).

In preferred embodiments, with reference again to FIG. 2 of the drawings, the conference bridge 58 not only connects the participating mobile subscribers, but also connects a monitoring node 55 to the virtual channel group 50. The monitoring node 55 can be an operator or a computer connected to monitor the communications within traffic channels 15 of the virtual channel group 50. Although the monitoring node 55 is shown within the MSC/VLR 14, it should be understood that the monitoring node 55 could be a separate node connected to the MSC/VLR 14. Typically, the computer or operator would glisten" for key words that are illegal or offensive. If the monitoring node 55 determines that one or more of the mobile subscribers needs to be disconnected due to transmission of illegal or offensive content, the monitoring node 55 can request the MSC/VLR 14 to disconnect those mobile subscribers from the virtual channel group 50.

In order for the monitoring node 55 to request a particular mobile subscriber to be disconnected, the monitoring node 55 must first be able to correlate the speech with the particular mobile subscriber. This can be accomplished in many ways. For example, as illustrated in FIG. 2, connections 52 from all of the individual mobile subscribers participating in the virtual channel group 50 can first be routed to the monitoring node 55 before being grouped together in the conference bridge 58. Therefore, the monitoring node 55 can receive the speech from each mobile subscriber separately, enabling the monitoring node 55 to easily identity which mobile subscriber(s) has spoken one of the "forbidden" words.

Once the MSC/VLR 14 receives notification from the monitoring node 55 that a particular MS 20 should be disconnected, the MSC/VLR 14 instructs the BSC 23 to release the traffic channel 15a and 15b assigned to the MS 20. In response, the BSC 23 instructs the BTS 24 and MS 20 to release the assigned traffic channel 15a and 15b. Alternatively, instead of releasing the traffic channel 15a and 15b, the MSC/VLR 14 can send a warning USSD message (not shown) to the MS 20, warning the MS 20 that if another violation occurs, the MS 20 will be disconnected. As a further alternative, prior to releasing the traffic channel 15a and 15b, the MSC/VLR can send a notification USSD message (not shown) to the MS 20, notifying the MS 20 that the connection is being terminated due to content.

Once the MS 20 connection is terminated, information 70 about the disconnection, such as the identity of the mobile subscriber, e.g., the IMSI number, the nature of the violation and the number of times that the MS 20 has been disconnected due to content can be retained in the MSC/VLR 14 to prevent that MS 20 from rejoining the group. Optionally, the network operator can define certain words or a certain number of disconnections that act as permanent bars to rejoinder. Another option would be for the network operator to define a certain time period that the violating mobile subscriber is barred from joining that virtual channel group. For example, a timer 75 could be included in the MSC/VLR 14. When the mobile subscriber is disconnected due to content, the timer 75 would be initiated. At the expiration of the timer 75, the mobile subscriber could once again join the virtual channel group 50. It should be noted that the timer 75 could be used to prevent the mobile subscriber from re-joining the same virtual channel group 50 or any other virtual channel group 50.

The specific virtual channel groups 50 are defined by the network operator and are only valid within the PLMN 10 associated with the network operator. Therefore, if an MS 20 roams outside of the PLMN 10 area, the MS 20 would be disconnected from the virtual channel group. However, if the MS 20 roams inside of the PLMN 10, a handover to a neighboring cell 22 (shown in FIG. 1) would be performed to continue the connection to the virtual channel group 50.

If the neighboring cell 22 is served by a neighboring MSC/VLR (not shown), a handover to the neighboring MSC/VLR would also be required. In this case, the conference bridge 58 would be within the original MSC/VLR 14 and between the original MSC/VLR 14 and the neighboring MSC/VLR.

Figure 4:
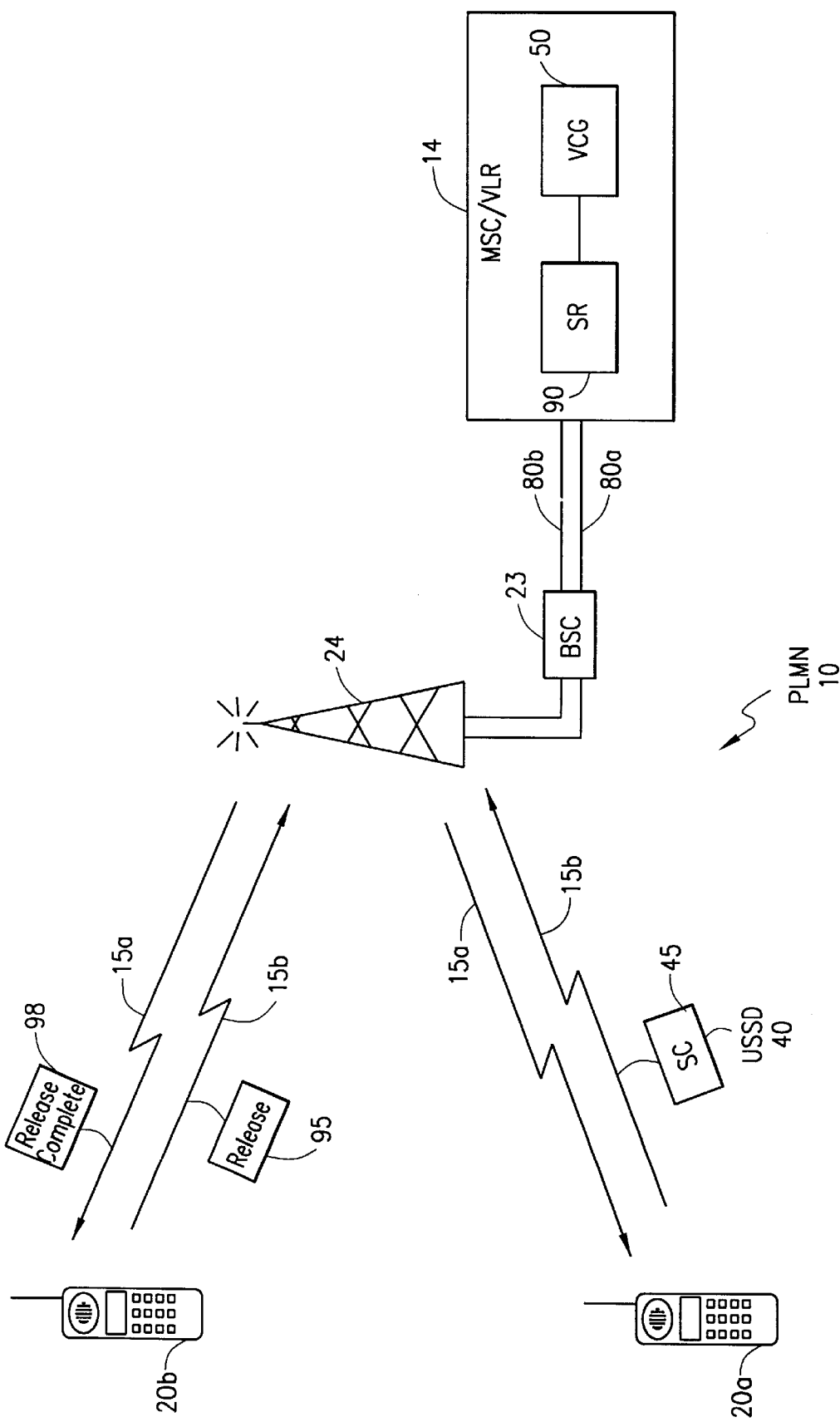
FIG. 4 is a block diagram illustrating the formation of a virtual CB channel group of mobile subscribers built over the air, in accordance with embodiments of the present invention.

With reference now to FIG. 4 of the drawings, in a second embodiment, the virtual channels can be built directly over the air. In this embodiment, MSs 20a and 20b within range of each other can communicate directly, using the same forward and reverse traffic channels 15a and 15b, respectively. Although these traffic channels 15a and 15b are allocated and controlled by the BSC 23, the speech on these traffic channels 15a and 15b is not actually received or transmitted by the BSC 23. The speech is transmitted transparently through the BTS 24 between the MSs 20a and 20b. Thus, with this embodiment, monitoring of communications would not be feasible.

In this embodiment, the MSs 20a and 20b would act as walkie-talkies communicating directly with other. Each MS 20a and 20b involved would be assigned the same traffic channel (forward 15a and reverse 15b) within the same cell 22 (shown in FIG. 1). However, each MS 20a and 20b would still have a separate signaling connection 80a and 80b, respectively, to the MSC/VLR 14. Thus, the control signaling after call establishment would be handled in much the same way, except that call release would be accomplished by each individual MS 20 simply not tuning to that traffic channel 15a and 15b.

Figure 5:
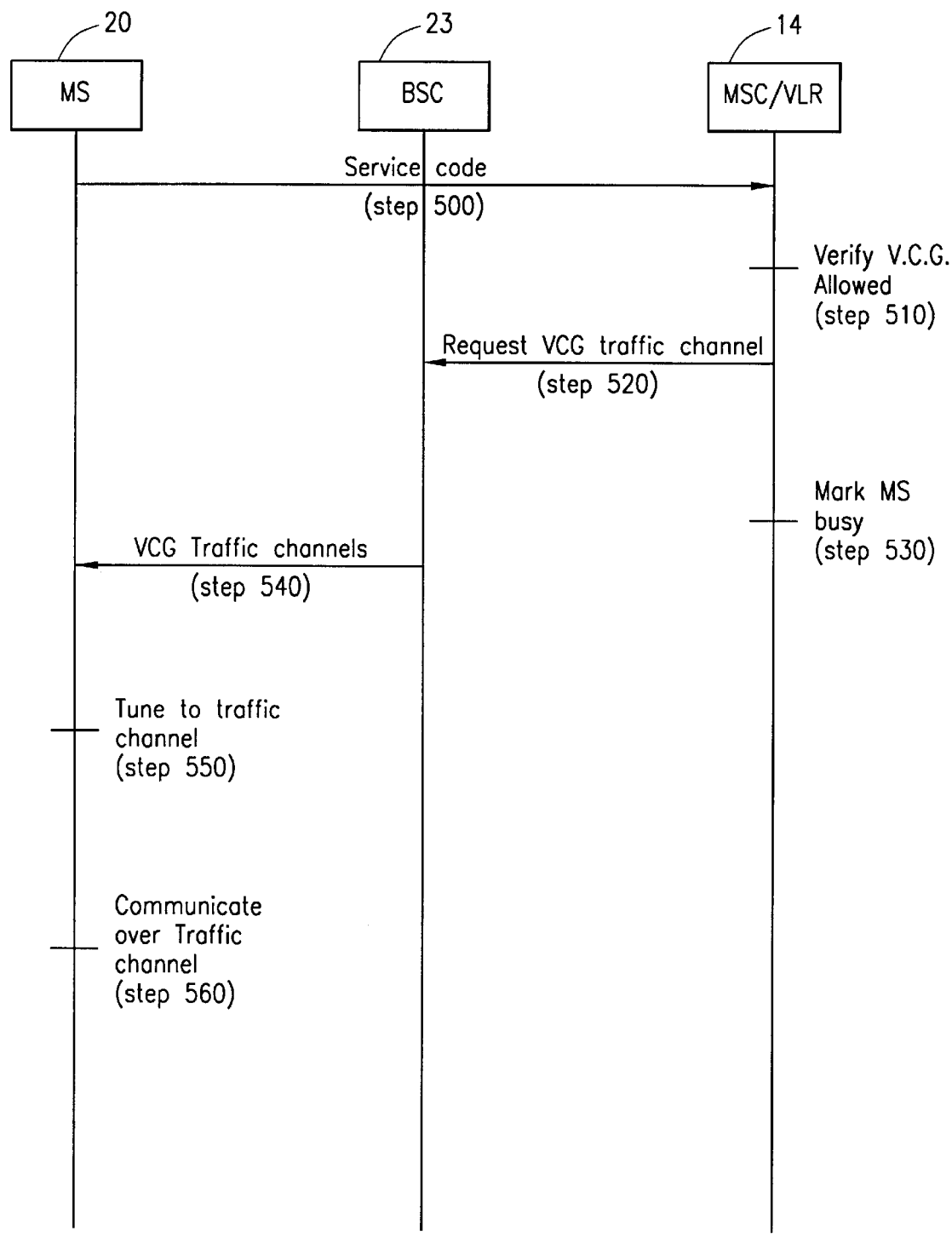
FIG. 5 is a signaling diagram illustrating sample signaling for participating in a group of the type shown in FIG. 4 of the drawings.

With reference now to FIG. 5 of the drawings, which will be described in connection with FIG. 4 of the drawings, in this embodiment, when an MS, here MS 20a, sends a service code 45, with a request to join a designated virtual channel group 50, in a USSD message 40 (step 500), the MSC/VLR 14 can verify that the MS 20 10 is allowed to join the designated virtual channel group 50 (step 510). If so, the MSC/VLR 14 can request the BSC 23 to forward the traffic channel 15a and 15b associated with the designated virtual channel group 50 to the MS 20a (step 520), and the MSC/VLR 14 can mark the MS 20a as busy with the designated virtual channel group 50 in a subscriber record 90 associated with the MS 20a (step 530). When the MS 20a receives the traffic channel 15a and 15b (step 540), the MS 20a can tune to this traffic channel 15a and 15b (step 550), and begin sending and receiving speech to other participating mobile subscribers over this traffic channel 15a and 15b (step 560).

With reference again to FIG. 4 of the drawings, if one of the MSs 20a or 20b roams into a different cell 22 (shown in FIG. 1), or if the radio conditions change for some other reason, in order for the virtual channel group 50 to continue, a handover would have to be ordered to another cell 22. In this case, the connection over the air would not be possible, and the connection would have to be built in the MSC/VLR 14, with the speech connection going via the BTS 24, BSC 23 and MSC/VLR 14, using a conference bridge 58 as discussed in connection with FIG. 2 above.

If, during the over the air virtual channel group 50 connection, one of the MSs, here MS 20b, wants to terminate the connection, that MS 20b would send a Release message 95 to the MSC/VLR 14. Upon reception of the Release message 95, the MSC/VLR 14 can time stamp the charging record (not shown) of that MS 20b with the amount of time that the MS 20b was involved in the connection and send a Release Complete message 98 to the MS 20b, instructing the MS 20b to discontinue listening to the traffic channel 15a and 15b. However, the MSC/VLR 14 will not instruct the BSC 23 to release the traffic channel 15a and 15b, as long as other participating mobile subscribers are still involved in the virtual channel group 50. It should be understood that the time stamp can be determined by the amount of time between the time that the MSC/VLR 14 received the request to join the designated virtual channel group 50 and the time that the MSC/VLR 14 received the Release message 95.

As will be recognized by those skilled in the art, the innovative concepts described in the present application can be modified and varied over a wide range of applications. Accordingly, the scope of patented subject matter should not be limited to any of the specific exemplary teachings discussed, but is instead defined by the following claims.

What is claimed is:

1. A telecommunications system for providing at least one network-defined virtual channel group to mobile stations within a cellular network, comprising:
   a select one of said mobile stations within said cellular network for sending a request to join a designated one of said at least one network-defined virtual channel group;
   means for providing to said select mobile station a list of said at least one network-defined virtual channel group for said select mobile station to select from; and
   a mobile switching center in wireless communication with said select mobile station for receiving said request and assigning a traffic channel to said select mobile station for communicating with other mobile stations participating in said designated network-defined virtual channel group, said assigned traffic channel being associated with said designated network-defined virtual channel group.

2. The telecommunications system of claim 1, wherein said mobile switching center further comprises at least one conference bridge for connecting said select mobile station to said designated network-defined virtual channel group.

3. The telecommunications system of claim 2, wherein said mobile switching center assigns a transaction identifier to said select mobile station to associate said select mobile station with said designated network-defined virtual channel group.

4. The telecommunications system of claim 2, further comprising:
   a monitoring node connected to said designated network-defined virtual channel group via said at least one conference bridge, said monitoring node for monitoring speech content of all of said mobile stations participating in said designated network-defined virtual channel group.

5. The telecommunications system of claim 4, wherein said monitoring node sends a request to said mobile switching center to disconnect an improper one of said mobile stations from said designated network-defined virtual channel group in response to a determination that said speech content associated with said improper mobile station meets predetermined conditions.

6. The telecommunications system of claim 5, wherein said mobile switching center sends a warning message to said improper mobile station in response to receiving said request from said monitoring node.

7. The telecommunications system of claim 5, wherein said mobile switching center disconnects said improper mobile station from said designated network-defined virtual channel group in response to receiving said request from said monitoring node.

8. The telecommunications system of claim 7, wherein said mobile switching center sends a notification message to said improper mobile station when said mobile switching center disconnects said improper mobile station.

9. The telecommunications system of claim 7, wherein said mobile switching center stores information associated with the disconnection of said improper mobile station from said designated network-defined virtual channel group.

10. The telecommunications system of claim 9, wherein said mobile switching center prevents said improper mobile station from re-joining said designated network-defined virtual channel group based on said information.

11. The telecommunications system of claim 1, wherein said request comprises an Unstructured Supplementary Service Data message.

12. The telecommunications system of claim 1, wherein said means of providing includes a display on said select mobile station, said list being provided on said display, said select mobile station selecting said designated network-defined virtual channel group on said select mobile station.

13. The telecommunications system of claim 12, wherein said means for providing includes means for receiving by said select mobile station, said list including a set of virtual channel identifiers from said mobile switching center, said set of virtual channel identifiers including at least an indication of said designated network-defined virtual channel group selected by said select mobile station.

14. The telecommunications system of claim 1, further comprising:
   a home location register associated with said select mobile station for storing information associated with said network-defined virtual channel groups that said select mobile station has subscribed to.

15. The telecommunications system of claim 1, wherein said select mobile station communicates directly with the other mobile stations participating in said designated network-defined virtual channel group over said assigned traffic channel, said select mobile station and said other mobile stations all being assigned said assigned traffic channel.

16. The telecommunications system of claim 15, wherein said select mobile station disconnects from said designated network-defined virtual channel group by sending a release message to said mobile switching center.

17. A method for allowing mobile stations to connect to at least one network-defined virtual channel group within a cellular network, comprising the steps of:
   providing to a select one of said mobile stations a list of at least one network-defined virtual channel group for said select mobile station to choose from;
   sending a request to join a designated one of said at least one network-defined virtual channel group from said select mobile station to a mobile switching center in wireless communication with said mobile station within said cellular network;
   assigning a traffic channel associated with said designated network-defined virtual channel group to said select mobile station; and
   communicating, by said select mobile station, with other mobile stations participating in said designated network-defined virtual channel group, using said assigned traffic channel.

18. The method of claim 17, wherein said step of communicating further comprises the step of:
   connecting said select mobile station to said designated network-defined virtual channel group using at least one conference bridge.

19. The method of claim 18, wherein said step of connecting further comprises the step of:

assigning a transaction identifier associated with said network-defined virtual channel group to said select mobile station to associate said select mobile station with the other mobile stations participating in said designated network-defined virtual channel group.

20. The method of claim 18, further comprising the step of:

monitoring speech content provided by all of said mobile stations participating in said designated network-defined virtual channel group.

21. The method of claim 20, further comprising the steps of:

determining that said speech content associated with an improper one of said mobile stations meets predetermined conditions; and sending a request to disconnect said improper mobile station from said designated network-defined virtual channel group to said mobile switching center.

22. The method of claim 21, further comprising the step of:

sending a warning message from said mobile switching center to said improper mobile station in response to receiving said request to disconnect.

23. The method of claim 21, further comprising the step of:

disconnecting, by said mobile switching center, said improper mobile station from said designated network-defined virtual channel group in response to receiving said request to disconnect.

24. The method of claim 23, wherein said step of disconnecting further comprises the step of:

sending a notification message from said mobile switching center to said improper mobile station when said mobile switching center disconnects said improper mobile station.

25. The method of claim 23, further comprising the step of:

storing information associated with said step of disconnecting said improper mobile station from said designated network-defined virtual channel group.

26. The method of claim 25, further comprising the step of:

preventing said improper mobile station from rejoining said designated network-defined virtual channel group based on said information.

27. The method of claim 17, wherein said step of providing further comprises the steps of:

displaying said list on a display of said select mobile station; and selecting said designated network-defined virtual channel group on said select mobile station.

28. The method of claim 27, wherein said step of providing further comprises the step of:

receiving, by said select mobile station, said list including a set of virtual channel identifiers from said mobile switching center, said set of virtual channel identifiers including at least an indication of said designated network-defined virtual channel group selected by said select mobile station.

29. The method of claim 17, further comprising the step of:

verifying that said select mobile station is allowed to join said designated network-defined virtual channel group.

30. The method of claim 29, wherein said step of verifying further comprises the step of:

receiving from a home location register associated with said select mobile station, information associated with said network-defined virtual channel groups that said select mobile station has subscribed to.

31. The method of claim 29, wherein said step of verifying further comprises the step of:

providing, by said select mobile station, to said mobile switching center, information associated with said network-defined virtual channel groups that said select mobile station has subscribed to.

32. The method of claim 17, wherein said step of communicating further comprises the steps of:

assigning said assigned traffic channel to said select mobile station and other mobile stations participating in said designated network-defined virtual channel group; and communicating directly between said select mobile station and said other mobile stations participating in said designated network-defined virtual channel group over said assigned traffic channel.

33. The method of claim 32, further comprising the step of:

sending a release message from said select mobile station to said mobile switching center to disconnect from said designated network-defined virtual channel group.

* * * * *

UNITED STATES PATENT AND TRADEMARK OFFICE
CERTIFICATE OF CORRECTION

PATENT NO.   : 6,477,366 B1
DATED        : November 5, 2002
INVENTOR(S)  : Eric Valentine et al.

It is certified that error appears in the above-identified patent and that said Letters Patent is hereby corrected as shown below:

Column 1,
Lines 24-25, replace "push-to-talk,"" with -- "push-to-talk," --

Column 5,
Line 7, replace "would glisten"" with -- would "listen" --

Column 6,
Line 35, replace "MS 20 10" with -- MS 20 --

Signed and Sealed this

Sixth Day of May, 2003

JAMES E. ROGAN
*Director of the United States Patent and Trademark Office*